United States Patent [19]
Franz

[11] Patent Number: 5,224,895
[45] Date of Patent: Jul. 6, 1993

[54] LEARNING ACTIVITY FOR SMALL CHILDREN

[76] Inventor: Judi K. Franz, Rte. 3, Box 3083, Elk Mound, Wis. 54739

[21] Appl. No.: 866,202

[22] Filed: Apr. 9, 1992

[51] Int. Cl.⁵ ............................................. A63H 3/12
[52] U.S. Cl. .................................. 446/321; 446/297; 446/100; 446/72
[58] Field of Search ................ 446/100, 98, 321, 297, 446/72; 434/96, 155

[56] References Cited

U.S. PATENT DOCUMENTS

| | | | |
|---|---|---|---|
| 1,428,456 | 9/1922 | Stranders | 434/170 |
| 1,535,925 | 10/1922 | Lee | 446/100 |
| 2,327,718 | 8/1943 | Kassler | 434/96 |
| 2,592,078 | 4/1952 | Taylor et al. | 446/100 |
| 3,094,791 | 6/1963 | Thiebes | 434/96 |
| 3,841,019 | 10/1974 | Lorenzo | 446/98 X |
| 3,967,389 | 7/1976 | Brooks | 434/304 |
| 4,671,514 | 6/1987 | Wilson-Diehl | 446/100 |
| 4,776,823 | 10/1988 | Hanlon | 446/321 |
| 4,979,924 | 12/1990 | Manger | 446/100 |

FOREIGN PATENT DOCUMENTS

| | | | |
|---|---|---|---|
| 423200 | 1/1935 | United Kingdom | 434/96 |
| 1137088 | 12/1968 | United Kingdom | 434/96 X |
| 1289292 | 9/1972 | United Kingdom | 434/96 X |

*Primary Examiner*—Paul J. Hirsch
*Assistant Examiner*—L. Thomas
*Attorney, Agent, or Firm*—Richard C. Litman

[57] ABSTRACT

An aid for small children learning the different basic animal characteristics includes a base facial component which may be used in combination with different sets of ear, nose and mouth, and collar components to form representations of various different types of animals. The same base facial component may be used with different sets of ear, nose and mouth, and collar components, as the ear, nose and mouth, and collar components provide the necessary distinction to provide a representation of a specific animal. Various attachment systems for the various components are provided, and further provision is made for precluding the ingestion of any of the components by small children by the inclusion of pliable stiffners to prevent folding or tearing. Color coding may be used to provide easier recognition of the common components for a given specific animal type, and the name of a specific animal may be included on one of the components in order to provide further identification and to assist beginning reading skills. The learning activity may be displayed on a ferrous metal surface due to the magnet provided on the rear of the base facial component, and a voice box or sound producing device corresponding to the sound made by a specific animal type may be included on the rear surface of each of the nose and mouth components. When the nose and mouth component is pressed into place on the base facial component, the voice box will be activated to produce the appropriate sound for the animal representation being assembled.

8 Claims, 1 Drawing Sheet

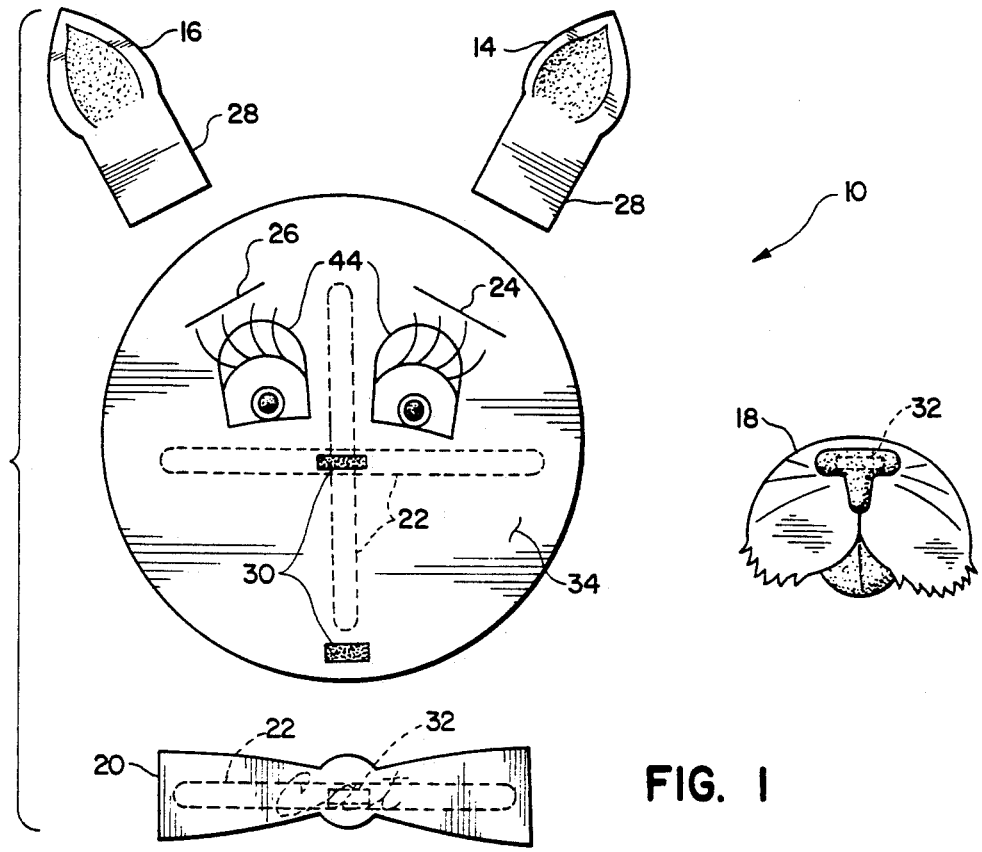
FIG. 1
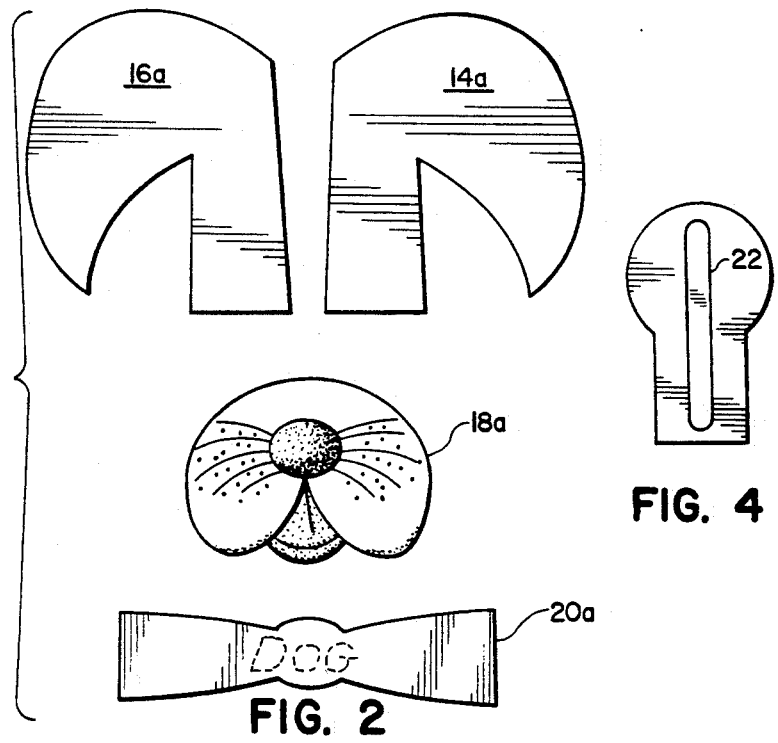
FIG. 2
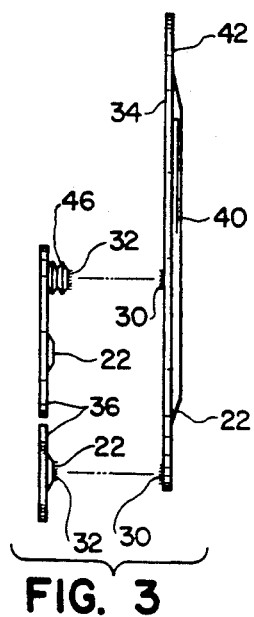
FIG. 3
FIG. 4

LEARNING ACTIVITY FOR SMALL CHILDREN

FIELD OF THE INVENTION

This invention relates generally to games, devices and the like for the education of children, and more specifically to a kit containing representations of various animal features which may be assembled in various combinations for the teaching of such knowledge to small children.

BACKGROUND OF THE INVENTION

Children are particularly attracted to animals, and this attraction has resulted in a myriad of books, stories, toys, games, etc. relating to that subject area, to attract and absorb the attention of small children. Typically, such children learn the characteristics of various animals by means of experience with such games, stories and etc.

While small children are capable of absorbing a great deal of knowledge, obviously those children may learn much more efficiently if they are taught in a methodical manner. However, there is a great deal of very basic knowledge which is customarily never taught to small children, but rather taken for granted that they will adequately learn such knowledge merely by experience. While this is true, a methodical teaching system results in much more rapid and efficient learning of virtually any knowledge or skill. Such a teaching method is best when provided in the form of a toy or game, particularly with small children and their relatively short attention spans.

The need arises for a toy or game which provides a basic shape, which shape may be embellished by additional shapes representing various characteristics of various animals. The shapes may represent various facial features (eyes, nose, ears, etc.) common to all higher animals, and may be color coded in order to further broaden the learning experience. Various assembly means may be incorporated and at least one element of each set of animal features may include the name of the animal, thereby providing additional assistance in very early reading skills for those children capable of absorbing such knowledge. Finally, by means of careful construction, the device may be formed to eliminate many of the hazards which may accompany such toys comprising a plurality of parts when used by small children.

DESCRIPTION OF THE RELATED ART

U.S. Pat. No. 1,340,512 issued to M. Wild on May 18, 1920 discloses a Toy, which device provides a number of abstract shapes which may be used or combined in various ways to create caricatures of a human face. The patent notes the extension of the concept to animals, but no examples are shown. Further, no means of securing the shapes to the basic form is disclosed, nor is any color coding according to animal type disclosed, as only a human caricature is shown.

U.S. Pat. No. 1,562,225 issued to R. H. Garman on Nov. 17, 1925 discloses an Instruction Outfit For Children including a variety of abstract shapes in the manner of the patent to Wild above, and further including a series of sheets having matching abstract shapes arranged to form an object. The various shapes may be adhered to the matching shapes on the appropriate sheet. The device provides only a single use for each sheet and set of shapes due to the "gummed" nature of the attachment, and does not lend itself to the overall appearance of an animal.

U.S. Pat. No. 2,109,965 issued to N. S. Booth on Mar. 1, 1938 discloses an Educational Device capable of forming a three dimensional caricature. The head of the caricature is formed of a natural or artificial egg, with other components used to form articles such as collars, hats and the like. Any facial characteristics desired must be applied to the egg separately. No relationship to the present invention is seen.

U.S. Pat. No. 2,592,078 issued to R. P. Taylor et al. on Apr. 8, 1952 discloses an Educational Figure Toy Device which is essentially similar to the device of the patent to Garman discussed above. However, Taylor et al. disclose the use of a "non-drying adhesive" for the removable securing of the various abstract shapes to the base. The use of such an adhesive is a concern of the present invention, as such chemicals may be hazardous to small children if ingested, and tend to quickly lose their effectiveness with soiling and contamination due to handling in any case.

U.S. Pat. No. 3,280,499 issued to C. E. Studen on Oct. 25, 1966 discloses an Expanded Plastic Board Having Apertures Retaining Punched Pieces. The board and accompanying pieces are relatively thick, and the apertures are punched completely through the board. The punched pieces exactly fit the apertures in the board, and consequently each may only be assembled in one way in its single corresponding aperture. No color coding or caricature adaptability is disclosed. In the event that a different set of pieces is used, a different board must be provided to accommodate those different pieces, unlike the present invention. Moreover, the expanded polyethylene plastic material incorporated in the device is relatively soft and pieces of such material are prone to breakage and ingestion by small children, unlike the present invention.

U.S. Pat. No. 4,937,181 issued to J. Rogers on Jun. 26, 1990 discloses an Educational Display System comprising a plurality of shapes of geographical or political entities, such as states, which shapes may be inserted within a closely fitting board. Additional features, such as mountains, etc., may be included as overlays on the other shapes. The plural overlays, inset board, single pattern of assembly, and foam core of the components, each serve to render the device distinct from the present invention.

Finally, U.S. Pat. No. 4,952,153 issued to N. J. McAllister on Aug. 28, 1990 discloses a Surface Mounted Magnetic Toy having various components each fitting within a specifically defined recess on a three dimensional base. Little imagination is required, as each of the shapes may only be inserted into a single corresponding recess and in a specific orientation, in the manner of the devices of the patents to Studen and Rogers described above. The device is considerably heavier and bulkier than the present invention, and no variation in the shapes which may be applied to the base is provided; additional bases must be provided if different insert shapes are to be used.

None of the above noted patents, either singly or in combination, are seen to disclose the specific arrangement of concepts disclosed by the present invention.

SUMMARY OF THE INVENTION

By the present invention, an improved learning activity for small children is disclosed.

Accordingly, one of the objects of the present invention is to provide an improved learning activity adaptable to form representations of various specific animal characteristics.

Another of the objects of the present invention is to provide an improved learning activity containing various components which may be combined with a base to form various animal caricatures.

Yet another of the objects of the present invention is to provide an improved learning activity in which the components used to form a specific animal caricature may be color coded in order to promote ease of recognition.

Still another of the objects of the present invention is to provide an improved learning activity in which at least one component of each specific animal caricature includes the name of the animal.

A further object of the present invention is to provide an improved learning activity which includes a plurality of means for the attachment of the components to the base.

Ad additional object of the present invention is to provide an improved learning activity which includes means for displaying the aid, as in a magnetic attachment to a ferrous metal surface.

Another object of the present invention is to provide an improved learning activity which may include an audio device to simulate the sound of the appropriate animal.

Yet another object of the present invention is to incorporate additional structural members in order to preclude the ingestion of the various components of the present invention by small children.

Still another object of the present invention is to provide a single common base component including standard features, which component may be embellished by the addition of sets of other components to represent a specific animal.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is an exploded perspective view of the present invention showing the base facial component and one set of additional components which may be used to form a specific caricature.

FIG. 2 is a view of another set of various components which may be used to form a representation of a different animal, in combination with the base facial component.

FIG. 3 is a side view of the base facial component and some additional components, showing additional features.

FIG. 4 is a rear view of a component of the present invention, showing the inclusion of an additional structural member thereon.

Similar reference characters designate corresponding parts throughout the several figures of the drawings.

DESCRIPTION OF THE PREFERRED EMBODIMENT

Referring now to the drawings, particularly FIG. 1 of the drawings, the present invention will be seen to relate to a device to aid in the teaching of various animal or other facial components and their associated characteristics, to small children. Learning aid 10 includes a base facial component 12 of a generally round or ovoid shape, left and right ear components 14 and 16, a nose and mouth component 18, and a collar or bow tie representation 20 including the name of the given animal. Components 12 through 20 will be seen to be formed of a relatively thin planar material, providing for ease of handling by small children and others and ease of storage. Preferably, the various components of learning aid 10 are formed of a relatively durable plastic material, providing sufficient strength to prevent deformation due to the inherent weight of the material used. However, any suitable material (paper of any desired strength and/or thickness, etc.), may be substituted as desired. The various components comprising learning aid 10 may be stored in an organizer having specific pockets or receptacles for the components. Such an organizer may be constructed in book form, or alternatively in the form of one or more sheets which may be folded or rolled for more compact storage.

FIGS. 1, 3 and 4 disclose an additional safety feature of learning aid 10: The inclusion of additional component reinforcing members 22 along the rear surfaces of the components. Reinforcing members 22 incorporated with each of the facial components 12 through 20 serve to preclude the intentional deformation of those components to a width sufficiently narrow to permit ingestion by a small child. Reinforcing members 22 may be provided in two dimensions along the surface of any component 12 through 20 as required, depending upon the size and shape of the given component 12 through 20. Reinforcing members 22 are preferably formed of a relatively stiff plastic component, which may be further padded with a foam material for softness if desired. Reinforcing members 22 may of course be provided in other forms and materials as desired.

The left and right ear components 14 and 16 and nose/mouth component 18 of FIG. 1 will be seen to form a caricature or representation of a cat when they are assembled upon base component 12; collar or tie component 20 is labeled accordingly. The components 14 through 20 will be seen to form a single set having in common a variety of facial features common to a single animal type. However, any one of a multitude of animal or other representations or caricatures may be formed using a single base component 12 of the present invention in combination with any given set of components, such as component set 14 through 20 of FIG. 1 or component set 14a through 20a for FIG. 2, for example. As the typical face or head of most higher animals is of a generally round or ovoid shape, it will be seen that a single base facial component 12 having a generally round or ovoid shape may be used in combination with a given set of additional components to form a representation of virtually any animal or creature imaginable.

A further example is provided in FIG. 2. The set including the left and right ear components 14a and 16a and nose/mouth component 18a will be seen to represent a dog when assembled upon base component 12, and collar/tie component 20a is correspondingly named. Obviously other names may be used, such as the specific name of a family pet, or teaching aid 10 may be used to facilitate the teaching of a second language by providing the name of the animal in another language. Other keys may be used for learning, such as rhymes, short stories, etc. These various means of assistance may be printed upon the back surface of the various components, or in the form of separate sheets or booklet, as desired.

In order to further aid small children in the recognition of these features, the present invention provides for the color coding of the components 14 through 20 of a given animal representation or caricature. For example, the set of components 14 through 20 used in combination with base component 12 to form the cat representation of FIG. 1, may be shaded in a pink or coral color, while other ear, mouth/nose and collar/tie components used with base component 12 to form a bear, may be colored in brown. The colors chosen may be further selected in order to provide a mnemonic device for further assisting in the memorization of these various names and features, by selecting colors whose first letter is the same as that of the animal represented; hence, the examples cited above, in which a coral shade was used with the cat components, and brown was used in combination with the components for a bear. Other examples will be evident, and of course any given color is unimportant so long as a consistent color is used to shade each of the ear, nose/mouth, and collar/tie components for any given animal or creature. In any case, only one base facial component is required, as any of the various sets of animal or other components may be installed thereupon to form a representation of any desired animal or creature. Accordingly, base component 12 is preferably provided with a color or shade unlike any of those used for coloring or shading any of the other components used to form any other animal or character.

Component sets 14 through 20 may be attached to base component 12 using any one of a number of means. The preferred embodiment provides for left and right slots 24 and 26 for the insertion of the respective ear components 14 and 16. Slots 24 and 26 are positioned in the upper portion of base facial component 12 in order to provide for a reasonably realistic placement for ear components 14 and 16 once they are installed. Ear components 14 and 16 will each be seen to have a tab 28 extending from their respective bases, which tabs 28 may be inserted into slots 24 and 26 in order to locate left and right ear components 14 and 16 upon base facial component 12.

Nose/mouth facial component 18 and collar/tie component 20 may be secured to base component 12 by means of cooperating hook and loop fastening material portions 30 and 32, or by any other suitable means (not shown) such as snaps, tabs and slots as with ear components 14 and 16, magnets, etc. Whichever fastening system is used for the attachment of components 18 and 20 to base component 12, it is important that the fastening devices used be firmly and permanently secured to their respective components in order to preclude their removal and possible ingestion by small children. The present invention provides cooperating hook and loop material portions 30 on the front surface 34 of base component 12 and 32 on the cooperating rear surface 36 of nose/mouth component 18 and collar/tie component 20, due to the non toxic nature of such material, its durability and washability, and other advantages. In addition, such hook and loop material 30 and 32 may be securely sewn into place upon the respective components 12, 18 and 20 in order to prevent removal by small children.

It is important to provide recognition to small children for their accomplishments, and learning aid 10 provides for this by means of a magnet or magnets 40 secured to the rear surface 42 of base component 12 as shown in FIG. 3. When a child successfully completes the assembly of learning aid 10, the completed assembly may be attached to any suitable ferrous metal surface, such as a steel door as commonly found in the classroom, or a refrigerator or other appliance generally found in the home. Magnet or magnets 40 provide for the easily removable temporary attachment of learning aid 10, allowing learning aid 10 to be easily removed for disassembly and reassembly as another animal representation as desired.

Base facial component 12 of learning aid 10 is preferably relatively unornamented. However, the embodiment of FIG. 1 includes a representation of eyes 44 upon the front surface 34 of base component 12. It will be understood that eyes 44 may be printed, painted or otherwise permanently installed upon base component 12, or alternatively may be made removable in the manner of nose/mouth component 18 and collar/tie component 20, if desired. The embodiment of FIG. 1 provides for the permanent inclusion of eyes 44 due to the instinctive recognition of such a feature by nearly everyone, and the resulting aid in orientation such eyes 44 provide by their inclusion on an otherwise blank base component 12.

An additional feature which provides further interest and entertainment to small children is the inclusion of a voice box or sound producing apparatus 46 in the present invention. Many such devices are known which provide sounds approximating various animals, and which operate using various electronic, pneumatic or other principles. The embodiment of the present invention provides for such a voice box 46 preferably secured to the rear surface 36 of nose/mouth component 18. Preferably, the present invention uses voice boxes 46 operating upon a non electronic, pneumatic principle, in order to reduce the requirement for fresh batteries from time to time and the associated hazard of the possible ingestion of nicad or mercury batteries commonly used to power such electronic devices. A further advantage of the pneumatically operated voice boxes 46 is that when the nose/mouth component 18 is attached to the base component 12, the pressure used in the application of nose/mouth component 18 will also cause the attached voice box 46 to emit a sound. This will add further enjoyment to the assembly of learning aid 10, and it will be seen that the production of a sound by voice box 46 may be achieved at any time after the assembly of learning aid 10, merely by applying pressure to the nose/mouth component 18 in order to activate voice box 46. Different voice boxes 46 may be used with different nose/mouth components 18, 18a, or others, in order to cause an appropriate sound to be produced corresponding to the features of the specific set of components incorporating a given voice box 46, and the resulting specific animal type represented by learning aid 10 by the assembly of a given set upon base facial component 12.

From the foregoing, it will be seen that the present invention provides an enjoyable and easily manipulated aid for the teaching of basic animal characteristics to small children. The color coding, printed identification, and aural identification provided each serve to further positively reinforce the learning of the various basic characteristics associated with a given animal representation provided by learning aid 10. Of course, it will be seen that the various ear and other components may be mixed and installed upon base component 12 to produce a multitude of imaginary animals, which will serve to further entertain more advanced preschool children who have progressed beyond the recognition of the animals represented by learning aid 10. The ability of very small children to manipulate and assemble learning aid 10 to produce a representation or caricature of a given animal provides a sense of accomplishment to those small children, and the display means provided with learning aid 10 further serves to provide recognition to that accomplishment.

It is to be understood that the present invention is not limited to the sole embodiment described above, but encompasses any and all embodiments within the scope of the following claims.

I claim:

1. An apparatus for small children for learning the basic characteristics of different animal types, said apparatus including:
   a planar base facial component of circular shape adaptable to the formation of various different animal representations and including removable attachment means for sets of cooperating further components;
   a plurality of said sets of further components with each said set representing further specific characteristics of an animal type;
   each said set including a pair of planar ear components having the general shape and markings of the ears of a specific type of animal and including cooperating means for the removable attachment of said ear components to said base facial component;
   each said set further including a nose and mouth component having the general shape and markings of the nose and mouth of said specific type of animal and including cooperating means for the removable attachment of said nose and mouth component to said base facial component; and
   sound producing means attached to each said nose and mouth component rear surface with each said sound producing means providing a sound corresponding to one said specific animal type;
   whereby, one said set including components representing one said specific type of animal may be removably attached to said base facial component to form a representation of said specific type of animal and whereby said sound corresponding to said specific animal type is produced when pressure is applied to said nose and mouth component and said sound producing means is thereby compressed.

2. The apparatus of claim 1 including;
eye representations permanently marked upon said base facial component.

3. The apparatus of claim 1 wherein;
said cooperating removable attachment means comprises cooperating hook and loop fasteners.

4. The apparatus of claim 1 wherein;
said cooperating removable attachment means comprises slots within said base facial component and cooperating tabs on said further components.

5. The apparatus of claim 1 including;
like colors on each said set of further components, whereby
each said representation of said specific type of animal is further distinguished.

6. The apparatus of claim 1 wherein;
each said set includes a collar component,
each said collar component including a name corresponding to one said specific animal type.

7. The apparatus of claim 1 wherein;
each said base component and further components include rear surfaces having stiffening means thereupon.

8. The apparatus of claim 1 including;
magnetic attachment means secured to said base component rear surface.

* * * * *